United States Patent [19]

Hayashi

[11] Patent Number: 5,719,652
[45] Date of Patent: *Feb. 17, 1998

[54] ELECTRO-OPTICAL DISPLAY DEVICE

[75] Inventor: Masatake Hayashi, Kanagawa, Japan

[73] Assignee: Sony Corporation, Tokyo, Japan

[*] Notice: The term of this patent shall not extend beyond the expiration date of Pat. No. 5,646,757.

[21] Appl. No.: 824,313

[22] Filed: Mar. 26, 1997

Related U.S. Application Data

[63] Continuation of Ser. No. 428,418, Apr. 25, 1995, Pat. No. 5,646,757.

[30] Foreign Application Priority Data

Apr. 27, 1994 [JP] Japan ................... 6-089926

[51] Int. Cl.⁶ ................... G02F 1/1333
[52] U.S. Cl. ................... 349/122; 349/138
[58] Field of Search ................... 349/122, 138, 349/158, 74; 345/190, 193

[56] References Cited

U.S. PATENT DOCUMENTS

| | | |
|---|---|---|
| 4,836,655 | 6/1989 | Yamazaki . |
| 4,978,203 | 12/1990 | Yamazaki . |
| 5,066,109 | 11/1991 | Kuratate et al. . |
| 5,327,272 | 5/1992 | Fujiwara et al. . |
| 5,461,494 | 7/1992 | Sekimura et al. . |

FOREIGN PATENT DOCUMENTS 4-265 931  9/1992  Japan .

*Primary Examiner*—William L. Sikes
*Assistant Examiner*—Tiep H. Nguyen

[57] ABSTRACT

In a circuit equivalent to a plasma addressed display device for one pixel, a liquid crystal layer and a dielectric sheet are constructed according to $$RLC/(RLC+RG) < CG/(CLC+CG)$$

where RLC and CLC are respectively the resistance and capacity of the liquid crystal layer, and where RG and CG are respectively the resistance and capacity of the dielectric sheet. Accordingly, the circuit has a high pass characteristic, so that the circuit can reduce the gain of the DC component. Even when a data voltage includes a direct current offset, the DC component applied to the liquid crystal layer is low, and accordingly, it is possible to prevent the occurrence of image sticking.

1 Claim, 5 Drawing Sheets

ELECTRO-OPTICAL DISPLAY DEVICE

This is a continuation of application Ser. No. 08/428,418 filed. Apr. 25, 1995, now U.S. Pat. No. 5,646,757.

BACKGROUND OF THE INVENTION

The present invention relates to an electro-optical display device in which an electro-optical display cell and a dielectric sheet are layered together and in which data voltage passing through the dielectric sheet is written onto an electro-optical material layer of the electro-optical display cell.

A plasma addressed display device in which a plasma cell and the electro-optical display cell are layered together with a dielectric sheet in between, has been previously disclosed. FIG. 1 and FIG. 2 illustrate a construction of the plasma addressed display device 100.

In FIG. 1 and FIG. 2, the plasma addressed display device 100 is constructed of a flat panel in which the electro-optical display cell 1 and the plasma cell 2 are layered together with the dielectric sheet 3 placed between them. The dielectric sheet 3 is made up of laminate glass and other materials. It is necessary for such dielectric sheet 3 to be formed as thin as possible, for example into 50 μm in thickness, in order to allow the display cell 1 to be driven.

The display cell 1 is comprised of an upper glass substrate (upper substrate) 4. Inside the upper substrate 4, a number of data electrodes 5 made of transparent conductive material are constructed parallel to each other at predetermined intervals in such a way as to form parallel rows. The upper substrate 4 is separated from the dielectric sheet 3 at a predetermined distance by spacers 6. The space between the upper substrate 4 and the dielectric sheet 3 is filled with electro-optical material, liquid crystal, which forms a liquid crystal layer 7. The distance between the upper substrate 4 and the dielectric sheet 3 is, for example, 4 to 10 μm, and such distance is maintained equally over the display face. Material other than liquid crystal may also be used.

The plasma cell 2 is comprised of a lower glass substrate (lower substrate) 8. Inside the lower substrate 8, a number of anode electrodes 9A and cathode electrodes 9K which constitute plasma electrodes, are alternately placed so as to form columns parallel to each other and separated at a predetermined intervals. Each anode and cathode electrodes 9A and 9K has a barrier rib 10 in the middle of its upper side, which stretches along each electrodes and has a predetermined width. The tops of each of the barrier ribs 10 are in contact with the underside of the dielectric sheet 3, and this separates the lower substrate 8 from the dielectric sheet 3 by a specified distance.

A frit seal portion 11 made of low melting point glass is located on the circumference of the lower substrate 8 and combines the lower substrate 8 with the dielectric sheet 3 in an air-tight fashion. The space between the lower substrate 8 and the dielectric sheet 3 can be filled with an ionizable gas such as helium, neon, or argon, or with a mixture of such gases.

The spaces between the lower substrate 8 and the dielectric sheet 3 form discharge channels (spaces) 12 which are separated by the barrier ribs 10 and which run in rows parallel to each other. In other words, the discharge channels 12 form right angles with the data electrodes 5. Each of the data electrodes 5 acts as a column driving unit, while each of the discharge channels 12 acts as a row driving unit. Pixels 13 are provided where the discharge channels 12 intersect with the data electrodes 5 as shown in FIG. 3.

In such construction, when a predetermined voltage is applied between the anode electrode 9A and the cathode electrode 9K, which corresponds to the specified discharge channel 12, the gas in the discharge channel 12 is ionized, generating a plasma discharge, at which point the discharge channel 12 is held in anode electric potential. In this situation, when a data voltage is applied to the data electrode 5, the data voltage is written through the dielectric sheet 3 onto the liquid crystal layer 7 of each of the pixels 13, which pixels are arranged along a column corresponding to the discharge channel 12. When the plasma discharge is completed, the discharge channel 12 changes to a floating electric potential, and the liquid crystal layer 7 of each pixel 13 holds the written data voltage until the next writing period (for example, one field later or one frame later). In such process, the discharge channel 12 acts as a sampling switch, and the liquid crystal layer 7 of each of the pixels 13 acts as a sampling capacitor.

A display process is performed on a pixel basis because the liquid crystal is operated by the data voltage written onto the liquid crystal layer 7 of each of the pixels 13. Accordingly, a two-dimensional image can be displayed by scanning successively along a row the discharge channels 12 in which the plasma discharge is to be generated in order to write a data voltage onto the liquid crystal layer 7 of the pixels 13 arranged along the column.

However, when a liquid crystal display device is being driven, it is necessary to exclude a DC component in order to prevent such DC component from being applied to the liquid crystal. There is a problem in that a DC component applied to the liquid crystal causes an image sticking.

Similarly, in the plasma addressed display device described above, it is necessary to prevent a DC component from being applied to the liquid crystal 7. However, it is difficult to prevent the DC component from being applied to the liquid crystal layer 7 because of its construction. The reason is described below in reference to FIG. 4, which illustrates a circuit for one pixel equivalent to the plasma addressed display device 100.

In FIG. 4, reference character DS denotes the data voltage, reference characters RLC and CLC respectively denote a resistor and a capacitor for the liquid crystal layer 7, reference characters RG and CG respectively denote a resistor and a capacitor for the dielectric sheet 3, reference character SW1 denotes a virtual switch which is comprised of the discharge channel 12, reference character VB denotes a DC power supply, reference character R denotes a resistor for limiting a current, and reference character SW2 denotes a switch for applying a predetermined voltage between the anode electrode 9A and the cathode electrode 9K. When the switch SW2 is turned on, a predetermined voltage is applied between the anode electrode 9A and the cathode electrode 9K, the plasma discharge generated in the discharge channel 12 turns the virtual switch SW1 on, and a voltage relative to the data voltage DS is written through the dielectric sheet 3 onto the liquid crystal layer 7.

In this process, there are times when, due to the discharge condition, the virtual switch SW1 does not act as a simple switch, but has a direct current offset. In other words, the data voltage DS is sometimes written when the electric potential of the underside of the dielectric sheet 3 is lower than the anode electric potential, that is to say, at the middle electric potential between the anode electric potential and the cathode electric potential. This is dependent on a change in electric potential of the underside of the dielectric sheet 3 and actions caused by the discharge which reduce or weaken the charged particles (meta-stable particles).

For example, if the charged particles disappear when a electric potential difference remains as is between the anode electrode 9A and the cathode electrode 9K, the electric potential of the underside of the dielectric sheet 3 is lower than the anode electric potential, data voltage DS can be written, and the virtual switch SW1 has a direct current offset.

As described above, in the plasma addressed display device the virtual switch SW1 sometimes has a direct current offset so it is difficult to prevent the DC component from being applied to the liquid crystal thereby a problem of image sticking arises.

SUMMARY OF THE INVENTION

It is accordingly an object of the invention to provide an electro-optical display device with improved long-term reliability due to the elimination of image sticking, even when the virtual switch has a direct current offset causing the data voltage to have such direct current offset.

In one aspect of the present invention, an electro-optical display device is comprised of an electro-optical display cell which has an electro-optical material layer and a dielectric sheet which is layered on the electro-optical display cell. The electro-optical display cell and the dielectric sheet are constructed to meet the formula:

$$RLC/(RLC+RG) < CG/(CLC+CG)$$

where RLC and CLC are respectively the resistance and capacity for the electro-optical material layer of the electro-optical display cell for one pixel, and where RG and CG are respectively the resistance and capacity for the electro-optical material layer of the dielectric sheet for one pixel.

According to the present invention, a filter circuit which is comprised of the electro-optical cell and the dielectric sheet and which operates on the electro-optical material layer, has a high pass characteristic, so that the circuit can reduce the gain of the DC component. When the data voltage includes a direct current offset, the DC component applied to the electro-optical material layer is low, and accordingly, it is possible to improve reliability by preventing the image sticking.

Preferably, the electro-optical display device is further comprised of a rewriting means for rewriting data voltage applied to the electro-optical material layer to meet the formula:

$$fD > 1/(CLC \times RLC / 2\pi)$$

where fD is a rewriting frequency for a data voltage which is applied to the electro-optical material layer.

According to the preferred device, it is possible to build a high pass characteristic into the filter circuit for the electro-optical material layer, which is comprised of the electro-optical display cell and the dielectric sheet, which is high enough for the gain of the data voltage.

Preferably, the electro-optical display device is characterized in that the electro-optical display cell and the dielectric sheet are constructed to meet the formula:

$$\rho G \geq 10^3 \times (dLC/dG) \times \rho LC$$

where $\rho G$ and $dG$ are respectively the specific resistance and thickness of the dielectric sheet, and $dLC$ and $\rho LC$ are respectively the thickness and specific resistance of the electro-optical material layer.

According to the preferred device having the display cell and the dielectric sheet, the gain of the DC component taken through the high pass characteristic of the filter circuit for the electro-optical material layer which is comprised of the electro-optical display cell and the dielectric sheet, is less than $10^{-3}$. Accordingly, even if the direct current offset VOFF of the data voltage is at the 100V level, image sticking can effectively be prevented because the DC component applied to the electro-optical material layer is less than 0.1V.

The electro-optical display device may be further comprised of a plasma cell layered together with the dielectric sheet.

According to this construction, although the sampling switch may include the direct current offset due to the condition of the plasma discharge and, as the result, the data voltage includes the direct current offset, an image sticking is prevented, thereby improving reliability, because the DC component applied to the electro-optical material layer is reduced by the high pass characteristic of the filter circuit for the electro-optical material layer which is comprised of the electro-optical display cell and the dielectric sheet.

The electro-optical display device may be characterized in that the electro-optical display cell is comprised of a first substrate having a data electrode in an inner surface thereof and a liquid crystal layer placed between the dielectric sheet and the first substrate.

In such construction, it is possible to prevent the occurrence of image sticking, thereby improving reliability, because the DC component applied to the electro-optical material layer is reduced by the high pass characteristic of the filter circuit for the electro-optical material layer which is comprised of the electro-optical display cell and the dielectric sheet.

Additional objects and advantages of the present invention will be apparent from the following detailed description of a preferred embodiment thereof which is best understood with reference to the accompanying drawings.

DETAILED DESCRIPTION OF THE PREFERRED EMBODIMENT

A preferred embodiment according to the present invention is described below with reference to drawings. This embodiment is a plasma addressed display device according to the present invention.

Figure 4:
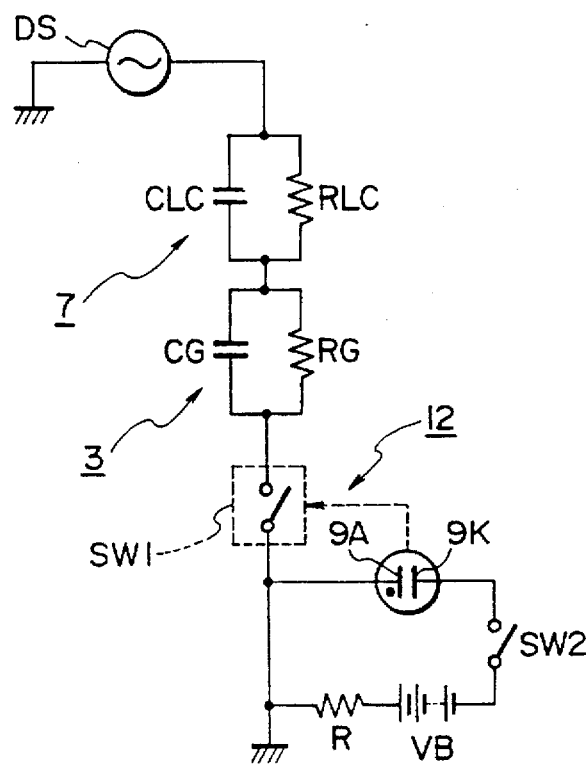
FIG. 4 illustrates, in block diagram form, a circuit equivalent to the plasma addressed display device for one pixel.
Figure 5:
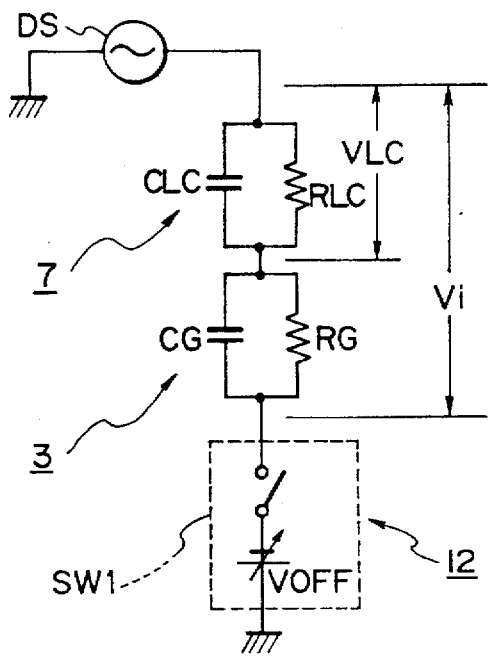
FIG. 5 illustrates, in block diagram form, a circuit equivalent to the plasma addressed display device for one pixel as a preferred embodiment of the present invention.

FIG. 5 illustrates an equivalent circuit for one pixel for the plasma addressed display device 100 (shown in FIG. 1 and FIG. 2), in which the virtual switch SW1, which is comprised of a discharge channel 12, has a direct current offset VOFF. In FIG. 5, the same reference numbers are employed to designate like portions in FIG. 4 and no detailed description is made.

When the virtual switch SW1 has the direct current offset VOFF, the data voltage to be written onto the liquid crystal layer 7 contains the direct current offset. Such direct current offset VOFF often reaches 100V when the driving voltage VB (shown in FIG. 4) applied between an anode electrode 9A and a cathode electrode 9K is 300V.

Referring to FIG. 5, the liquid crystal layer 7 and the dielectric sheet 3 are directly connected in a series and each of the liquid crystal layer 7 and the dielectric sheet 3 has respectively a resistance element and a capacitance element and can be regarded as a kind of a filter circuit which has a gain G ($|VLC|/|Vi|$) for the liquid crystal 7, where VLC is the voltage applied to the liquid crystal layer 7 and Vi is the voltage applied to the series circuit comprised of the liquid crystal layer 7 and the dielectric sheet 3.

A regular signal to be applied to the liquid crystal layer 7, in other words, the data voltage to be written, is a square wave, for which the frequency fD is, for example, 30Hz. Accordingly, in order to reduce the DC component applied to the liquid crystal layer 7, the gain G of the filter circuit which is comprised of the liquid crystal layer 7 and the dielectric sheet 3, must be much lower than the direct current and much higher than the signal with a frequency of more than fD.

Figure 1:
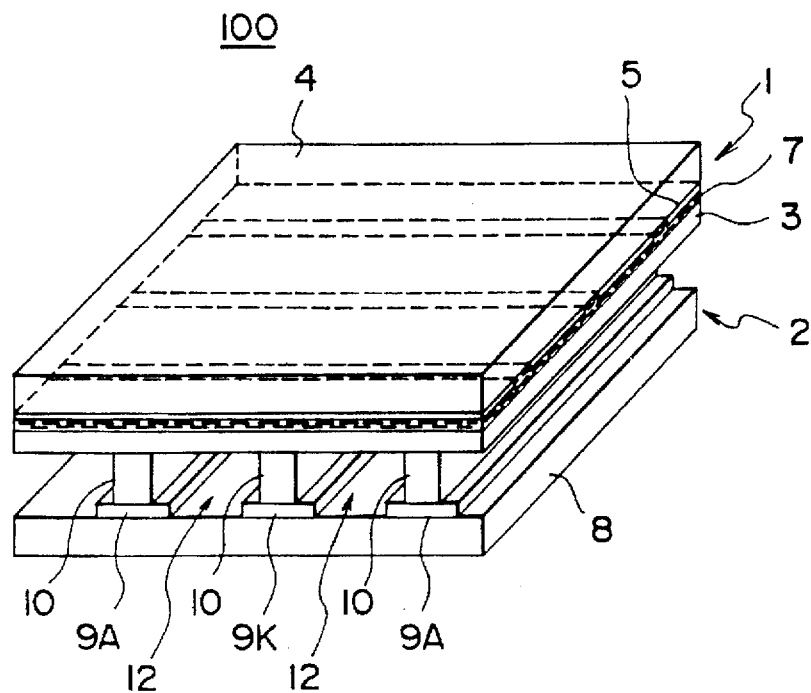
FIG. 1 illustrates a perspective view of a plasma addressed display device.
Figure 2:
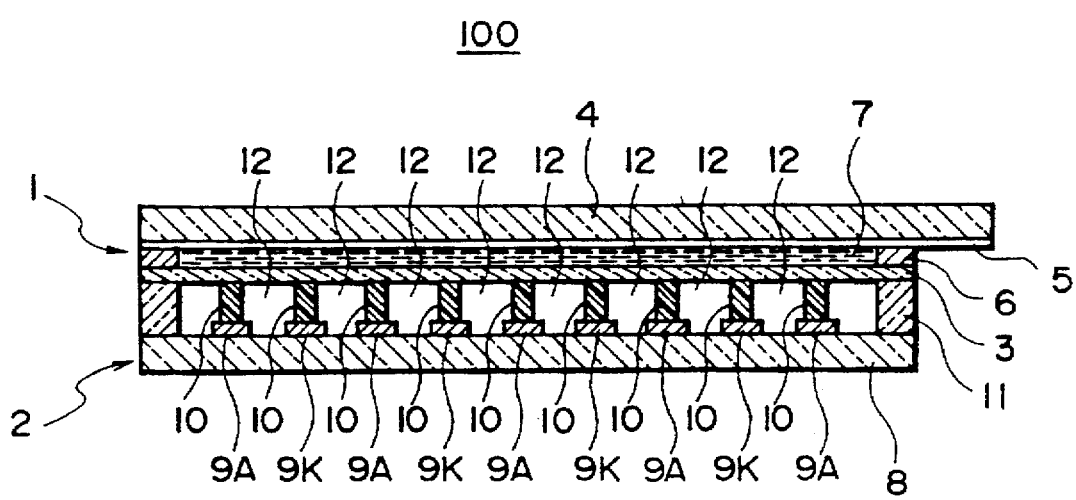
FIG. 2 illustrates a cross-sectional view of the plasma addressed display device.
Figure 3:
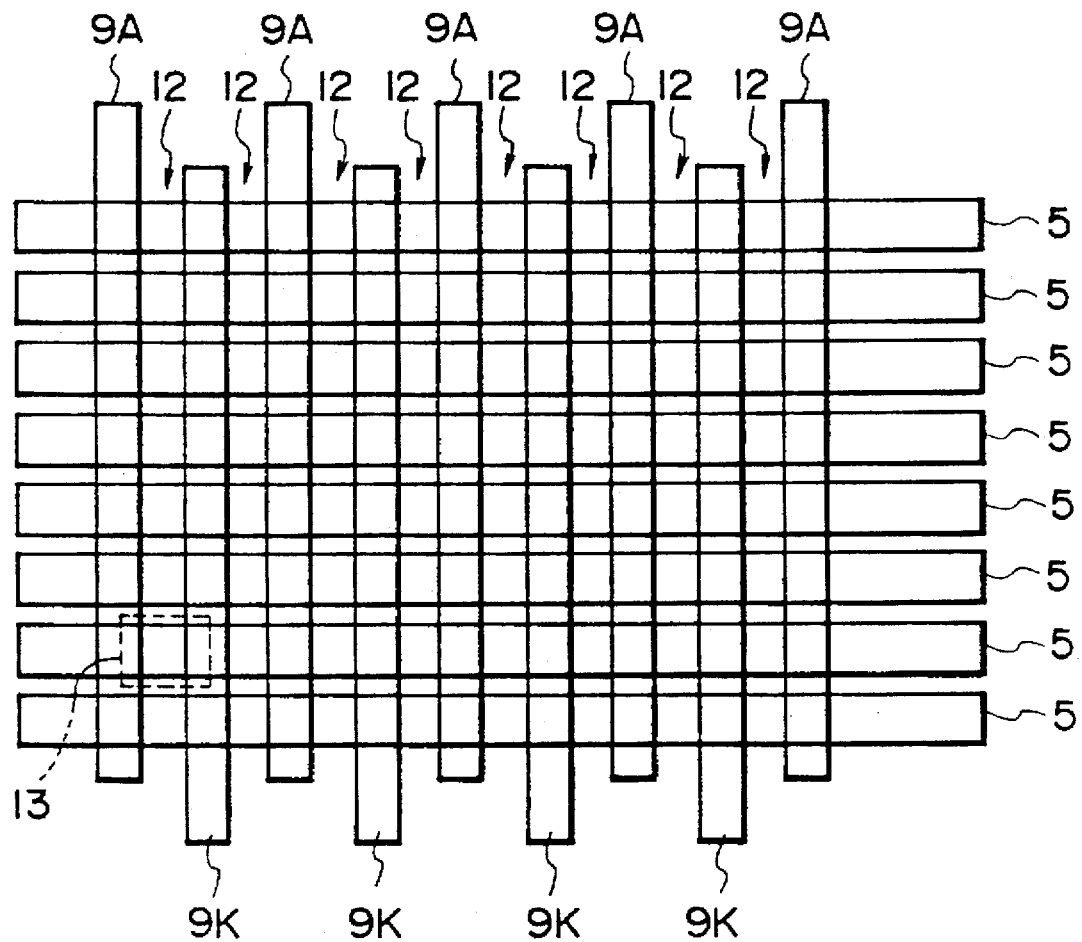
FIG. 3 illustrates the arrangement of date electrodes, plasma electrodes, and discharge channels.
Figure 6:
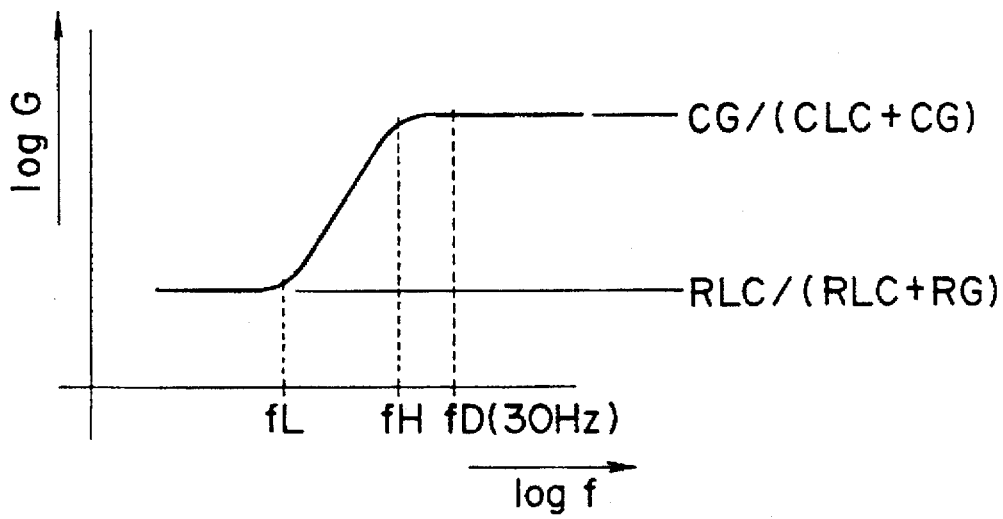
FIG. 6 illustrates the frequency characteristic for a liquid crystal layer of a filter circuit.

This embodiment is basically constructed as shown in FIG. 1 and FIG. 2, and allows the filter circuit, which is comprised of the liquid crystal layer 7 and the dielectric sheet 3 and which operates on the liquid crystal layer 7, to have a high-pass characteristic as shown in FIG. 6. When the resistance and the capacity of the liquid crystal layer 7 for one pixel are respectively RLC and CLC and the resistance and the capacity of the dielectric sheet 3 for one pixel are respectively RG and CG, the liquid crystal layer 7 and the dielectric sheet 3 are constructed to meet the formula:

$$RLC/(RLC+RG) < CG/(CLC+CG).$$

In such construction, the gain of the DC component is reduced, and accordingly, the electro-optical display device prevents the occurrence of image sticking, thereby improving reliability, even though the data voltage includes the direct current offset VOFF, because the DC component applied to the liquid crystal layer 7 is low. In FIG. 6, fL is approximately equal to $1/(CG \times RG/2\pi)$, and fH is approximately equal to $1/(CLC \times RLC/2\pi)$.

As shown in FIG. 6, when fD is the frequency at which the data voltage is re-written, the liquid crystal layer 7 is constructed to meet the formula:

$$fD > fH = 1/(CLC \times RLC/2\pi).$$

In such construction, the gain of the data voltage DS is increased enough that it is certain that the data voltage DS can be written onto the liquid crystal layer 7.

Figure 7:
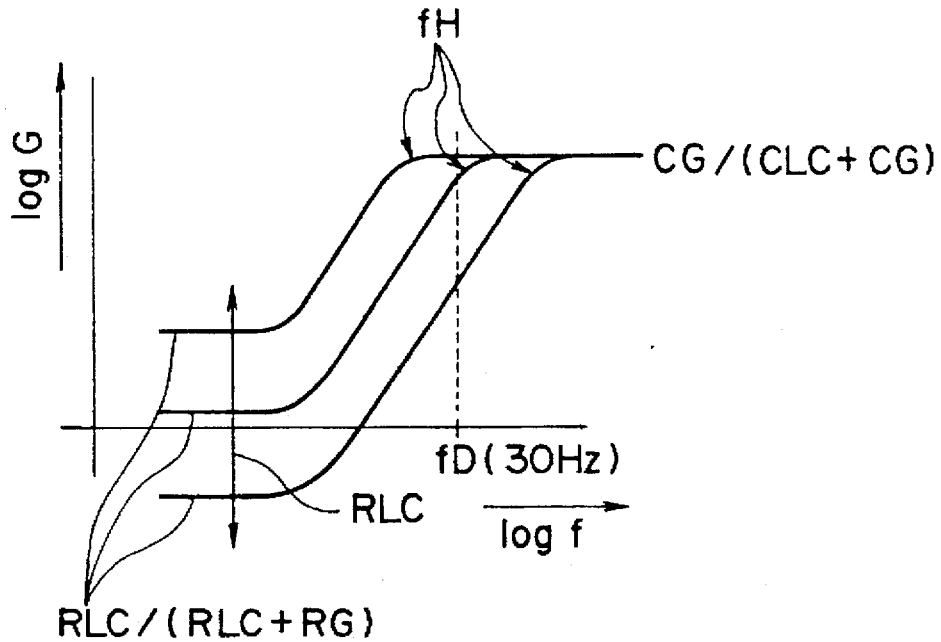
FIG. 7 illustrates the frequency characteristic when resistance of the liquid crystal layer is changed.

In this case, the gain G of the DC component of the filter circuit can be reduced by decreasing the resistance RLC or increasing the resistance RG, because the gain G of the DC component of the filter circuit for the liquid crystal layer 7, which is comprised of the liquid crystal layer 7 and the dielectric sheet 3, is given by $RLC/(RLC+RG)$. If the resistance RLC of the liquid crystal layer 7 is decreased, the gain of the DC component $G=RLC/(RLC+RG)$ as shown in FIG. 7 is decreased but the frequency fH is increased, so that it is impossible to provide the gain of the data voltage DS of the frequency fD. The resistance RLC of a liquid crystal material of high quality is comparatively high, and accordingly, it is unrealistic to attempt to decrease the gain G of the DC component by decreasing the resistance RLC.

Figure 8:
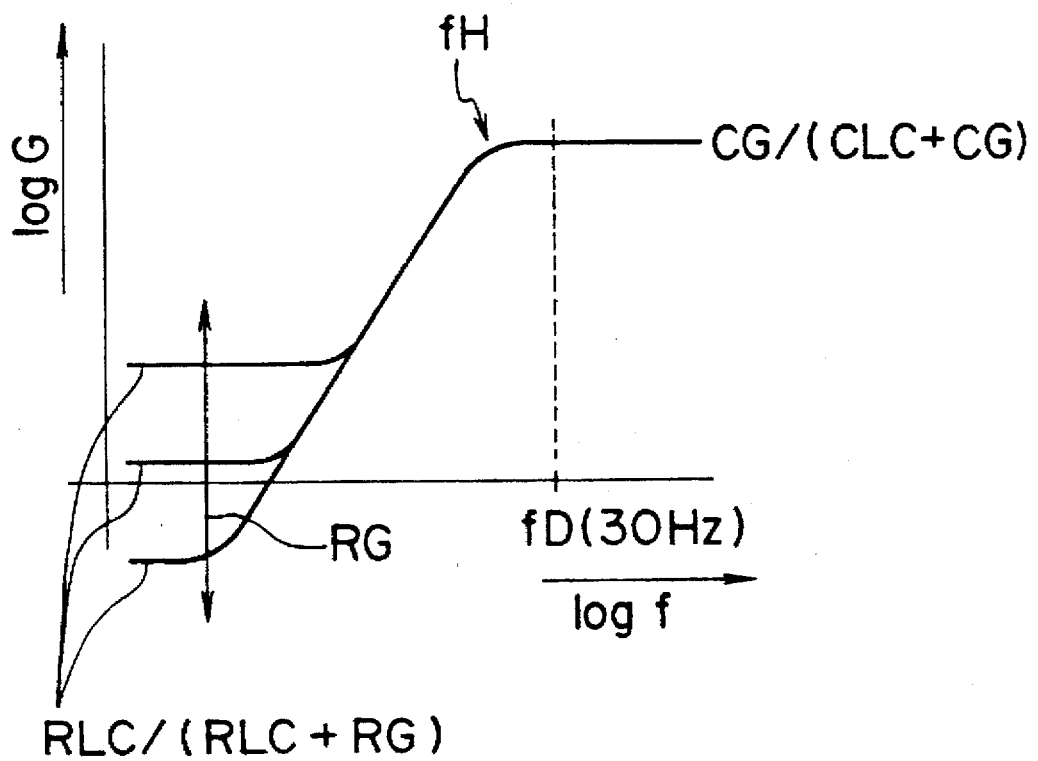
FIG. 8 illustrates the frequency characteristic when resistance of a dielectric sheet is changed.

On the other hand, if the resistance RG of the dielectric sheet 3 is increased, the gain $G=RLC/(RLC+RG)$ is decreased as shown in FIG. 8, but the frequency fH is not changed in a manner that is different from decreasing of the resistance RLC of the liquid crystal layer 7. Accordingly, it is desirable to increase the resistance RG of the dielectric sheet 3 in order to decrease the gain G of the DC component.

The gain G of the DC component of the filter circuit for the liquid crystal layer 7, which is comprised of the liquid crystal layer 7 and the dielectric sheet 3, can be approximated as follows. The voltage applied between the anode electrode 9A and the cathode electrode 9K is about 300V. The maximum direct current offset VOFF generated in the virtual switch SW1 is, experimentally, about 100V. The tolerance for the direct current applied to the liquid crystal layer 7 is about 0.1V. In this condition, the gain G of the DC component is given by the formula:

$$G \leq 0.1/100 = 10^{-3}.$$

In order to set the gain of the DC component "$G=RLC/(RLC+RG)$" at less than $10^{-3}$, when the thickness of the liquid crystal layer 7 is dLC, the specific resistance of the layer 7 is $\rho$LC, the thickness of the dielectric sheet 3 is dG, and the specific resistance of the sheet 3 is $\rho$G, the liquid crystal layer 7 and the dielectric sheet 3 should be constructed to meet the following formula:

$$\rho G \geq 10^3 \times (dLC/dG) \times \rho LC.$$

In such construction, an occurrence of image sticking can be prevented effectively when the gain of the DC component is less than $10^{-3}$, because the DC component applied to the liquid crystal layer 7 is approximately 0.1V even though the direct current offset VOFF of the data voltage is approximately 100V.

For example, liquid crystal material such as fluorine which is used as reliable liquid material, has the specific resistance $\rho$LC of about $10^{14} \Omega$ cm. When the thickness dLC of the liquid crystal layer 7 is, for example, 5 μm and the thickness dG of the dielectric sheet 3 is, for example, 50 μm, the specific resistance $\rho$G of the dielectric sheet 3 must be more than $10^{16} \Omega$ cm according to the equation described below, in order to set the gain G of the DC component at less than $10^{-3}$. For example, glass "AF45" made by Schott, which has the specific resistance of $10^{20}$ $\Omega$ cm at 20° C., can be used.

$$G = RLC/(RLC+RG) \quad (1)$$
$$= (10^{14} \times 5)/(10^{14} \times 5 + \rho G \times 50) \leq 10^{-3}$$
$$\therefore \rho G \geq 10^{16} \, \Omega cm$$

Although the electro-optical display cell 1 has the liquid crystal layer 7 in the embodiment as described above, this invention can also be applied to other devices which have an electro-optical material layer in which image sticking would be caused by the application of DC component.

Further, although the embodiment described above is a plasma addressed display device 100, this invention can also be applied to other kinds of electro-optical display devices in which data voltage is written through a dielectric sheet onto an electro-optical material layer. In this case, when the direct current offset is generated in the data voltage by a drift of the drive circuit, etc., such device can prevent the occurrence of image sticking by decreasing the DC component which is applied to the electro-optical material layer, and thus improve reliability.

According to the present invention, the filter circuit for the electro-optical material layer which is comprised of the electro-optical cell and the dielectric sheet, has a high pass characteristic so that the circuit can reduce the gain of the DC component. When the data voltage includes the direct current offset, the DC component applied to the electro-optical material layer is low, and accordingly, it is possible to improve reliability by preventing the occurrence of image sticking.

Further, according to the present invention, it is certain that the data voltage can be written onto the electro-optical material layer because the filter circuit for the electro-optical material layer which is comprised of the electro-optical cell and the dielectric sheet, has a high pass characteristic.

Moreover, according to the present invention, the gain of the DC component in the high pass characteristic of the filter circuit for the electro-optical material layer which is comprised of the electro-optical display cell and the dielectric sheet, is less than $10^{-3}$. Accordingly, even though the direct current offset VOFF of the data voltage is approximately 100V, the occurrence of image sticking can be effectively prevented because the DC component applied to the electro-optical material layer is less than 0.1V Moreover, according to the present invention, although the sampling switch may include the direct current offset due to the condition of the plasma discharge and, as the result, the data voltage contains the direct current offset, the reliability of the device is improved by preventing the occurrence of image sticking because the DC component applied to the electro-optical material layer is reduced due to the high pass characteristic of the filter circuit for the electro-optical material layer which is comprised of the electro-optical display cell and the dielectric sheet.

It will be obvious to those having skill in the art that many changes may be made in the above-described details of the preferred embodiment of the present invention. The scope of the present invention, therefore, should be determined by the following claims.

What is claimed is:

1. An electro-optical display device comprising:

an electro-optical display cell having an electro-optical material layer;

a dielectric sheet layered onto said electro-optical material layer; and means for rewriting a data voltage applied to said electro-optical material layer according to the following relationship:

$$fD > 1/(CLC \times RLC/2\pi)$$

where fD is a rewriting frequency for said data voltage which is applied to said electro-optical material layer, wherein, said electro-optical display cell and said dielectric sheet constructed according to the following relationship:

$$RLC/(RLC+RG) < CG/(CLC+CG)$$

where RLC and CLC are, respectively, the resistance and capacitance of said electro-optical material layer of said electro-optical display cell per each pixel of the display cell, and where RG and CG are, respectively, resistance and capacitance of said dielectric sheet per each pixel of the display cell, said electro-optical display cell and the dielectric sheet are further constructed according to the relationship, $$\rho G \geq 10^3 \times (dLC/dG) \times \rho LC$$

where $\rho G$ and dG are, respectively, the specific resistance and thickness of said dielectric sheet, and dLC and pLC are, respectively, the thickness and specific resistance of said electro-optical material layer, said dielectric sheet has a specific resistance of more than $10^{16}$ Ω cm, and a plasma cell is layered onto said dielectric sheet.

* * * * *